United States Patent
Madduri et al.

(10) Patent No.: US 8,234,644 B2
(45) Date of Patent: Jul. 31, 2012

(54) SELECTING A SYSTEM MANAGEMENT PRODUCT FOR PERFORMANCE OF SYSTEM MANAGEMENT TASKS

(75) Inventors: Hari Haranath Madduri, Austin, TX (US); Puthukode G. Ramachandran, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1418 days.

(21) Appl. No.: 11/776,990

(22) Filed: Jul. 12, 2007

(65) Prior Publication Data

US 2009/0019438 A1 Jan. 15, 2009

(51) Int. Cl.
G06F 9/46 (2006.01)
(52) U.S. Cl. ........................................ 718/102
(58) Field of Classification Search ............... None
See application file for complete search history.

(56) References Cited

U.S. PATENT DOCUMENTS

| | | |
|---|---|---|
| 5,119,493 A | 6/1992 | Janis et al. |
| 6,059,842 A * | 5/2000 | Dumarot et al. ............. 717/153 |
| 6,223,205 B1 * | 4/2001 | Harchol-Balter et al. ..... 718/105 |
| 6,453,265 B1 | 9/2002 | Dekhil et al. |
| 6,732,139 B1 | 5/2004 | Dillenberger et al. |
| 7,325,234 B2 * | 1/2008 | Smith ........................... 718/104 |
| 7,810,094 B1 * | 10/2010 | McClure et al. ............... 718/102 |
| 2001/0034752 A1 | 10/2001 | Kremien |
| 2003/0074387 A1 | 4/2003 | Tanaka |
| 2004/0163085 A1 | 8/2004 | Dillenberger et al. |
| 2004/0226013 A1 * | 11/2004 | Mariotti et al. ................ 718/100 |

FOREIGN PATENT DOCUMENTS

| | | |
|---|---|---|
| JP | 09319720 A | 12/1997 |
| JP | 2000029672 A | 1/2001 |

* cited by examiner

*Primary Examiner* — Emerson Puente
*Assistant Examiner* — Gregory Kessler
(74) *Attorney, Agent, or Firm* — Yee & Associates, P.C.; Jeffrey S. LaBaw (57) ABSTRACT

A computer implemented method, apparatus, and computer program product for managing a system. The process stores information regarding performance of a system management task to form a task execution history in response to performing a system management task. After receiving a request to perform to subsequent system management task, the process determines whether a task execution history is present for the subsequent system management task. The process then presents the task execution history for the subsequent task to a user for use in selecting a system management product from a plurality of system management products in response to the task execution history being present.

13 Claims, 4 Drawing Sheets

SELECTING A SYSTEM MANAGEMENT PRODUCT FOR PERFORMANCE OF SYSTEM MANAGEMENT TASKS

BACKGROUND OF THE INVENTION

1. Field of the Invention

The present invention relates generally to an improved data processing system, and in particular to a computer-implemented method and apparatus for configuration management. Still more particularly, the present invention relates to a computer-implemented method, apparatus, and computer-usable program product for managing a system of configuration items according to a history of use.

2. Description of the Related Art

Owners of computer systems often modify and upgrade their computer systems to prolong the utility of the computer systems. The rate of technological advancement often renders computer systems outdated in a short amount of time. Further, hardware and software components of a computer system also may malfunction and require replacement. For example, a computer system may receive new components, old components may be replaced, new software applications may be installed, and existing software may be upgraded.

These components that may be modified or upgraded are referred to as configuration items. A configuration item is a component of a system that may be individually managed. For example, where the system is a computer system, a configuration item may be a printer, wireless keyboard, webcam, operating system, or a software application. Where the system is a network of computer systems, the individual computer systems may also be configuration items.

Management of configuration items in a system is often accomplished by utilizing system management products. A system management product is an application operable to initiate the performance of system management tasks from a central location. System management tasks are tasks that are performed for maintaining a system of configuration items. System management tasks may be, for example, scanning a system to identify existing configuration items, changing system configurations to adhere to company policies, and distributing software or other updates.

In some instances, the system management task may be the deployment of software applications to multiple computer systems. For example, a network of computer systems may require a software patch to fix a potential security breach. Rather than visiting each computer system individually, and manually loading the software patch to each computer, system administrators utilize a system management product to distribute the software patch to the various computer systems on the network.

Certain system management products are better suited for performing certain management tasks. Often, however, a system administrator has no readily available objective information to consider before assigning a system management task to a system management product. For example, a system administrator may rely upon trial and error to determine which system management products are better suited for particular management tasks. This method of assignment is inefficient, however, particularly where other system administrators lack similar access and knowledge of the use of system management products. In addition, changing system conditions and configuration items may alter the performance of system management products, thereby rendering useless any previously gained knowledge.

Furthermore, the assignment of management tasks to system management products is fixed. In other words, unless a system administrator reassigns a system management task to a different system management product, the management task is continually performed by that system management product. Over time, due to changes in the system conditions, the particular system management product may no longer be the preferred system management product for handling a management task. However, a system administrator may lack sufficient information to justify reassigning that management task to a different system management product. Consequently, the performance of management tasks in a system may be occurring in the least efficient manner.

The currently used method for assigning management tasks fails to take into consideration the changing conditions of a system that may affect the assignment of system management tasks to system management products. Furthermore, currently existing system management products lack the ability to assist a system administrator in assigning system management tasks to system management products.

SUMMARY OF THE INVENTION

The illustrative embodiments described herein provide a computer implemented method, apparatus, and computer program product for managing a system. The process stores information regarding performance of a system management task to form a task execution history in response to performing a system management task. After receiving a request to perform to subsequent system management task, the process determines whether a task execution history is present for the subsequent system management task. The process then presents the task execution history for the subsequent task to a user for use in selecting a system management product from a plurality of system management products in response to the task execution history being present.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
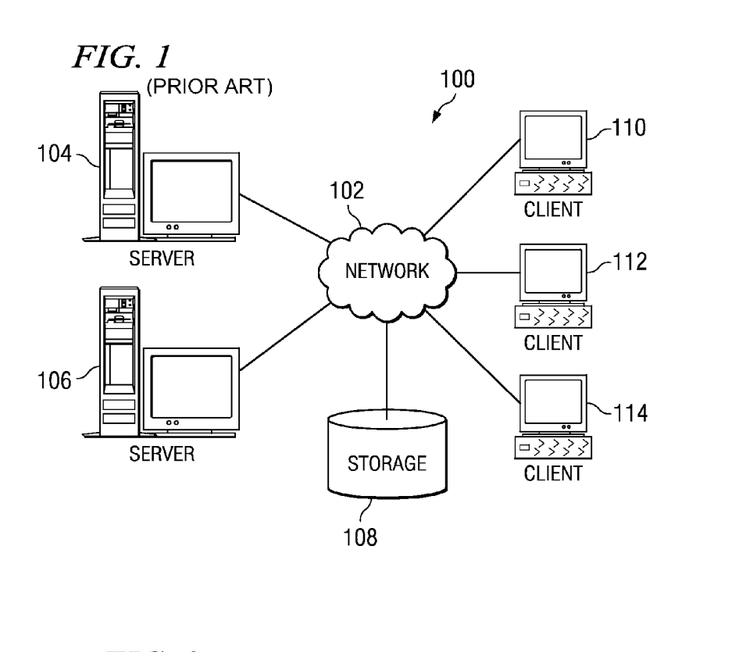
FIG. 1 is a pictorial representation of a network data processing system in which illustrative embodiments may be implemented.
Figure 2:
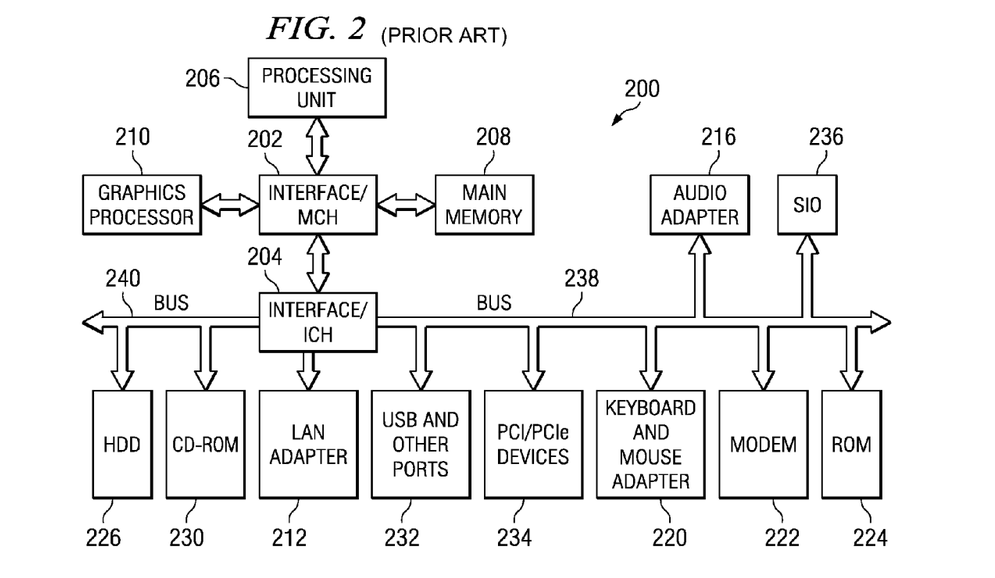
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer-implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to, or in place of, the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments described herein provide a computer-implemented method, apparatus, and computer program product for managing a system. The process stores information regarding performance of a system management task to form a task execution history in response to performing a system management task. After receiving a request to perform to subsequent system management task, the process determines whether a task execution history is present for the subsequent system management task. The process then presents the task execution history for the subsequent task to a user for use in selecting a system management product from a plurality of system management products in response to the task execution history being present.

A user may select a system management product for performing a system management task by identifying both the task and the system management product for performing the task. This selection may be made without any reference to a task execution history. However, in an alternate embodiment, a user may be presented with a task execution history to facilitate the selection of a system management product for performing a system management task.

In another embodiment, the user may input selection criteria and allow a configuration manager to select a system management product capable of performing the system management task according to the selection criteria. Further, in yet another embodiment, a configuration manager may suggest to a user the use of one or more system management products for performing a system management task. The configuration manager selects the suggested system management products by implementing a management policy.

Figure 3:
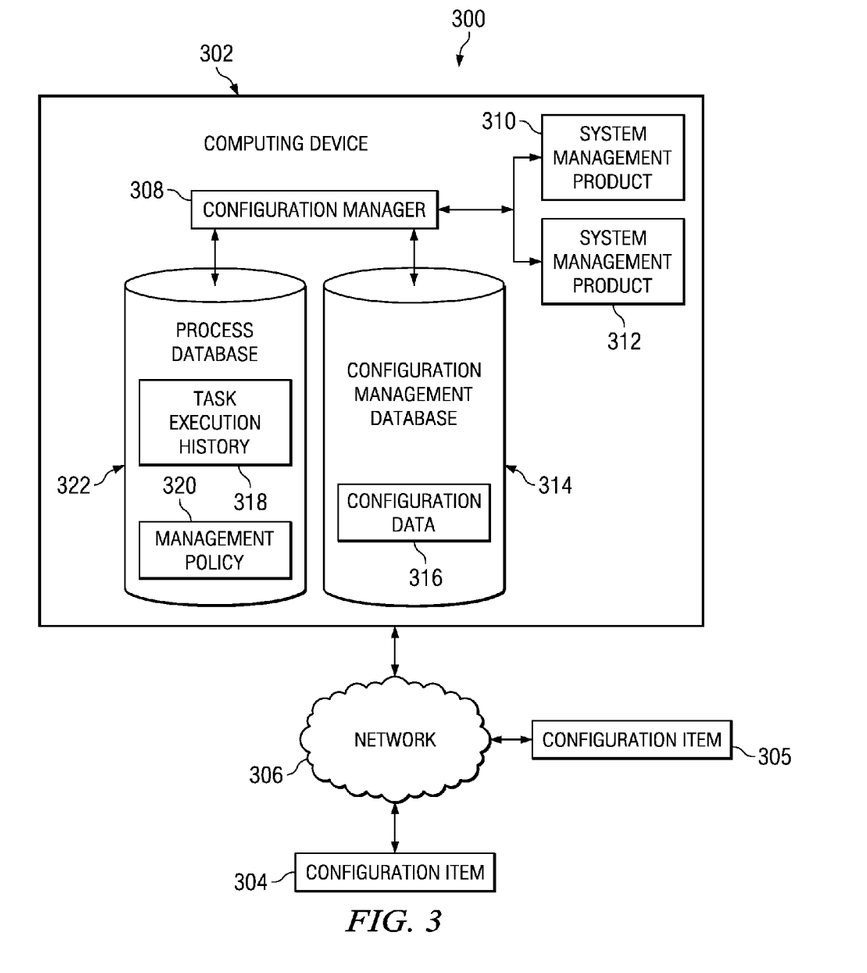
FIG. 3 is a diagram of data flow through components of a computing system for use in managing a system of configuration items in accordance with an illustrative embodiment.

Turning now to FIG. 3, a diagram of data flow through components of a system for use in managing a system of configuration items is depicted in accordance with an illustrative embodiment. System 300 is a system, such as network data processing system 100 in FIG. 1.

System 300 includes computing device 302. Computing device 302 is a computing device, such as server 104 and client 112 in FIG. 1. Computing device 302 is operable by a user to manage configuration items 304 and 305. A user is any person having authorization to manage the configuration items of network 306. The user may be, for example, a systems administrator or the owner of the configuration item. In this example, configuration items 304 and 305 are computer systems coupled to network 306. Network 306 is a network, such as network 102 in FIG. 1.

Computing device 302 includes configuration manager 308. Configuration manager 308 is a software application for managing configuration items in network 306. In particular, configuration manager 308 selects a set of system management products from a plurality of system management products for performing a set of system management tasks. Configuration manager 308 may perform the system management product selection according to input parameters supplied by a user of computing device 302. Configuration manager 308 may also provide recommendations to a user for the use of certain system management products that satisfy one or more predefined management policies.

As used herein, a "set" means one or more. Thus, the set of system management products is one or more system management products which may be selected from a plurality of system management products. In this example, the set of system management products includes system management products 310 and 312. System management products 310 and 312 may be, for example, IBM® Tivoli® Configuration Manager and IBM® Tivoli® Provisioning Manager. Tivoli is a registered trademark of International Business Machines, Inc. Similarly, a set of system management tasks is one or more system management tasks that may be performed by the set of system management products. Examples of system management tasks may include, for example, installing new software, updating software, installing fixes, listing installed software, backing up and restoring system images, changing physical and logical devices, configuring and unconfiguring devices, and listing installed devices.

To manage configuration items 304 and 305, configuration manager 308 requires information relating to the current status of the configuration items of network 306 and a history of the management tasks previously performed. Information relating to the status of configuration items is stored in configuration management database 314 as configuration data 316. Configuration data 316 is data relating to configurable attributes of configuration item 304.

For example, where configuration item 304 is a computer system, configuration data may describe the system's serial number, processor speed, IP address, and operating system. Where configuration item 304 is an employee, then configuration data 316 may describe the employee's skills, department, work schedule, and rate of pay. Similarly, where configuration item 304 is a software application, configuration data 316 may describe serial number, version, and deployment method of the software application. Configuration management database 314 is capable of automatically retrieving or receiving configuration data about configuration item 304 to maintain a real-time status of the configuration items of network 306.

By referencing the information stored in configuration data 316, configuration management database 314 may identify configuration items that may be outdated, inefficient, or in a state of disrepair. Thereafter, configuration management database 314 may generate an alert notifying a user of any recently discovered problems. In an alternate embodiment, configuration management database 314 may provide the necessary information to configuration manager 308 to generation the alert.

In response to receiving the alert, the user may identify an appropriate system management task for addressing the problem and select the system management product for performing the system management task. Alternatively, the users allow configuration manager 308 to select the system management product for performing a particular system management task. In this embodiment, the user provides configuration manager 308 with selection criteria for allowing configuration manager 308 to select the appropriate system management product to perform the system management task. For example, system management product 310 may perform system management tasks quicker, but may use greater bandwidth, whereas system management product 312 may perform system management tasks slower, but use less bandwidth. If a user provides selection criteria requiring the system management task to be performed in the quickest amount of time, then configuration manager 308 would select system management product 310.

In another embodiment, to facilitate the selection of the system management product from a collection of system management products, configuration manager 308 may provide the user with task execution history 318. Task execution history 318 is a description or account of all the previously executed system management tasks that have been performed in system 300 and the system management products that performed each task. Configuration manager 308 may present task execution history 318 to a user in various forms, such as a table, spreadsheet, a graph, a list, or any other commonly encountered form.

Figure 6:
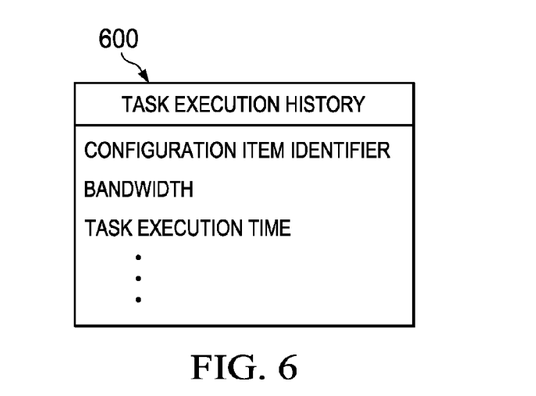
FIG. 6 depicts details of the task execution history for a subsequent system management task.

Task execution history 318 may include execution details such as those shown by element 600 of FIG. 6 that may help the user select a system management product for performing a particular system management task. Execution details are information relevant to the performance of a specific system management task by a specific system management product. For example, execution details may include a configuration item identifier identifying the configuration item serviced by a particular system management product and the system management task that was performed. In addition, the execution details may include, for example, an amount of time that was required to complete the system management task, an amount of bandwidth consumed by the system management product, a summary of problems or errors encountered by the system management product, and whether the execution was successful. Execution details may include any type of qualitative or quantitative information that may be helpful or useful for a user to select a system management product for performing a system management task. Thus, using task execution history 318, a user can make an informed decision as to which system management product should be selected for performing a given system management task.

Figure 5:
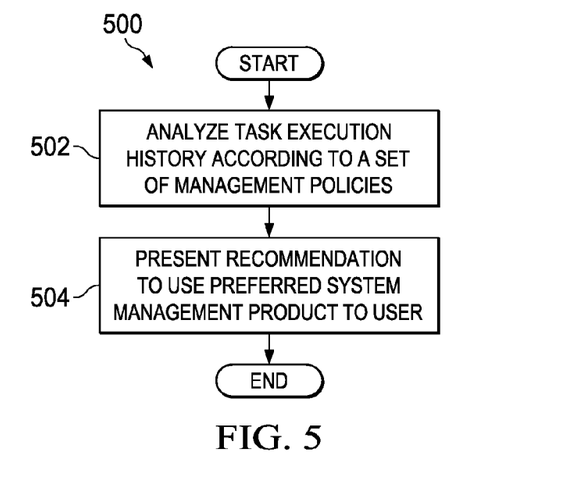
FIG. 5 is a flowchart further depicting the presenting step depicted at element 406 of FIG. 4.

Configuration manager 308 is also capable of analyzing task execution history 318 according to management policy 320 as depicted by element 502 of FIG. 5. Management policy 320 is a set of predefined rules for selecting a preferred system management product for performing a particular system management task. In addition, management policy 320 may also specify the particular configuration item for service by a particular system management product. In this manner, configuration manager 308 may automatically select a preferred system management product for performing subsequent system management tasks according to predefined criteria and task execution history 318. For example, the distribution of operating system security patches may be a system management task subject to a policy requiring that the patches be distributed in the quickest manner possible. System management products 310 and 312 may have been used in the past to distribute operating system security patches in the past. Thus, task execution history 318 includes information describing the execution details for the distribution of operating system security patches by system management products 310 and 312. If task execution history 318 indicates that system management product 310 performs the operating system security patch distribution in the least amount of time, then configuration manager 308 selects system management product 310 to perform this system management task. Alternatively, configuration manager 308 may provide to the user a recommendation for use of the preferred system management product to perform the system management task in accordance with management policy 320, as depicted by element 504 of FIG. 5. Thus, in this example, configuration manager 308 provides to a user a recommendation to use system management product 310 for distributing the security patch. In this embodiment, configuration manager 308 presents to the user an identity of the preferred system management product.

Task execution history 318 and management policy 320 are stored in process database 322. Process database 322 and configuration management database 314 may be any type of database. The databases may be, for example, a spreadsheet, a relational database, a hierarchical database, or the like. The database may be stored in the operating memory of the data processing system, externally on a secondary data storage device, locally on a recordable medium such as a hard drive, floppy drive, CD ROM, DVD device, remotely on a storage area network, such as storage area network 108 in FIG. 1, or in any other type of storage device.

After deploying a system management product, such as system management products 310 and 312, configuration manager 308 stores in process database 312 a history of the system management tasks performed by the set of system management products. In particular, the history describes execution details of every system management product executed in network 306.

Figure 4:
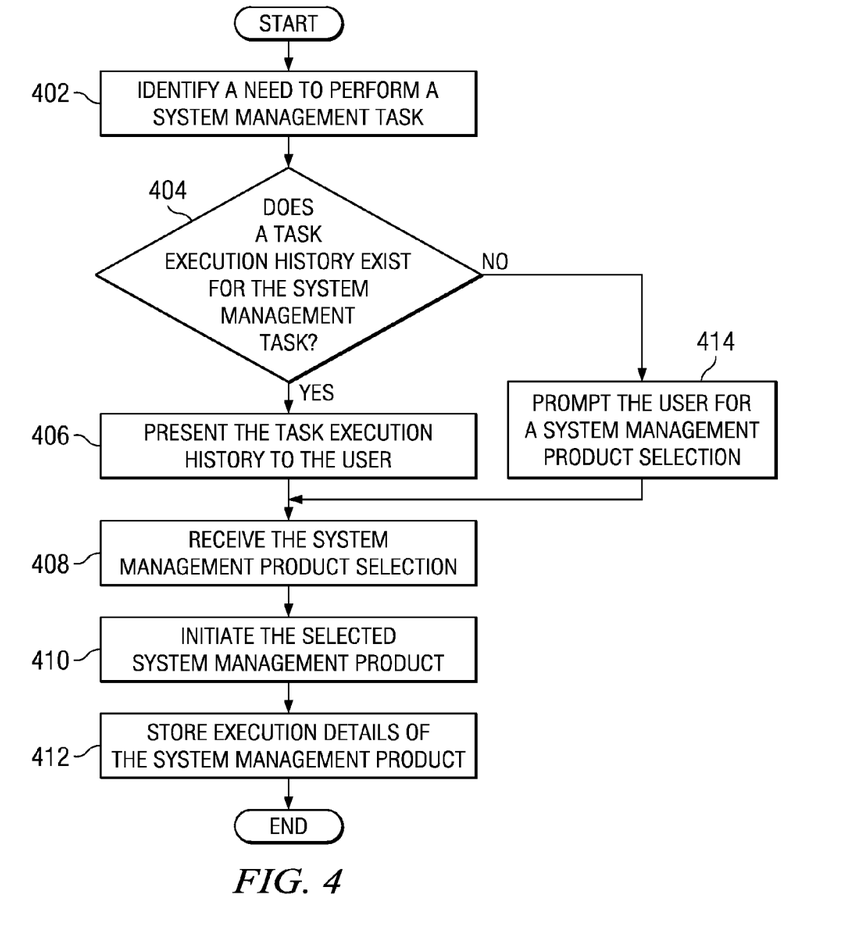
FIG. 4 is a flowchart of a process for implementing a configuration manager to manage a system in accordance with an illustrative embodiment.

Turning now to FIG. 4, a flowchart of a process for implementing a configuration manager to manage a system is depicted in accordance with an illustrative embodiment. The process may be performed by a software component, such as configuration manager 308 in FIG. 3.

The process begins by identifying a need to perform a systems management task (step 402). In particular, the process identifies a particular configuration item and a systems management task for bringing the configuration item up to date.

Thereafter, the process makes a determination as to whether relevant task execution history exists (step 404). If the process makes the determination that relevant task execution history exists, then the process presents the relevant task execution history to the user (step 406, which is further depicted by element 500 of FIG. 5). The relevant task execution history includes execution details to assist the user in deciding which system management product to select for performing the management task.

The process then receives the user's management system software selection (step 408) and initiates the user's selected management system software (step 410).

Once the task has been performed, the process then stores execution details (step 412) with the process terminating thereafter. The execution details are stored in a process database such as process database 312 in FIG. 3. The execution details are used to create a history of the system management products.

Returning now to step 404, if the process makes the determination that no relevant configuration history exists, then the process prompts the user for system management product selection (step 414), and the process continues to step 408.

The flowcharts and block diagrams in the different depicted embodiments illustrate the architecture, functionality, and operation of some possible implementations of methods, apparatus, and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the illustrative embodiments described herein provide a computer-implemented method, apparatus, and computer program product for managing a system. The process stores information regarding performance of a system management task to form a task execution history in response to performing a system management task. After receiving a request to perform to subsequent system management task, the process determines whether a task execution history is present for the subsequent system management task. The process then presents the task execution history for the subsequent task to a user for use in selecting a system management product from a plurality of system management products in response to the task execution history being present.

Using the method and apparatus described herein, a system administrator or other user is able to make informed decisions in assigning a system management task to a preferred system management product. The preferred system management product may be the system management product that performs the system management task the quickest, the system management product that utilizes the least amount of bandwidth, or the system management product having the highest rate of success in performing a particular system management task. Different policies may be defined that would allow the selection of different preferred system management products based on identifiable criteria or system conditions. Consequently, the efficiency of managing a system of configuration items has increased.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for managing a system, the computer-implemented method comprising:
    responsive to performing a system management task, storing information regarding performance of the system management task to form a task execution history;
    receiving a request to perform a subsequent system management task;
    responsive to receiving the request to perform the subsequent system management task, determining whether the task execution history is present for the subsequent system management task;
    responsive to the task execution history being present, presenting the task execution history for the subsequent task to a user, wherein the presenting step comprises analyzing the task execution history for the subsequent system management task according to a set of management policies to identify a preferred system management product for performing the subsequent system management task and presenting, to the user, a recommendation to use the preferred system management product for performing the subsequent system management task;
    selecting a system management product from a plurality of system management products; and
    performing the subsequent system management task using the system management product selected from the plurality of system management products.

2. The computer-implemented method of claim 1, wherein the task execution history for the subsequent system management task comprises a configuration item identifier, a bandwidth requirement, and an execution time.

3. The computer-implemented method of claim 1, wherein the system management product is a computer-executable application that initiates performance of the set of system management tasks, wherein the set of system management tasks are tasks that are performed for maintaining a system of configuration items, where the system of configuration items are data processing system components that are modified by the set of system management tasks.

4. The computer-implemented method of claim 1, wherein the system management product is a computer-executable application that initiates performance of system management tasks from a central location.

5. The computer-implemented method of claim 4, wherein the system management tasks are tasks that are performed for maintaining a system of configuration items.

6. The computer-implemented method of claim 5, where the system of configuration items are data processing system components that are modified by the system management tasks.

7. The computer-implemented method of claim 1, wherein the system management product is a computer-executable application that initiates performance of system management tasks, wherein the system management tasks are tasks that are performed for maintaining a system of configuration items, where the system of configuration items are data processing system components that are modified by the system management tasks.

8. A computer program product comprising:
    a non-transitory computer-usable medium including computer-usable program code for managing a system, the computer-usable program code comprising:
    computer-usable program code for storing information regarding performance of a system management task to form a task execution history in response to performing a system management task;
    computer-usable program code for receiving a request to perform a subsequent system management task;
    computer-usable program code for determining whether the task execution history is present for the subsequent system management task in response to receiving the request to perform the subsequent system management task;
    computer-usable program code for presenting the task execution history for the subsequent task to a user, wherein the computer-usable program code for program code for presenting the task execution history to the user comprises computer-usable program code for program code for analyzing the task execution history for the subsequent task according to a set of management policies to identify a preferred system management product for performing the subsequent system management task and computer-usable program code for program code for presenting, to the user, a recommendation to use the preferred system management product for performing the subsequent system management task;

computer-usable program code for selecting a system management product from a plurality of system management products in response to the task execution history being present; and computer-usable program code for performing the subsequent system management task using the system management product selected from the plurality of system management products.

9. The computer program product of claim 8, wherein the task execution history for the subsequent system management task comprises a configuration item identifier, a bandwidth requirement, and an execution time.

10. The computer program product of claim 8, wherein the system management product is a computer-executable application that initiates performance of system management tasks from a central location.

11. The computer program product of claim 10, wherein the system management tasks are tasks that are performed for maintaining a system of configuration items.

12. The computer program product of claim 11, where the system of configuration items are data processing system components that are modified by the system management tasks.

13. The computer program product of claim 8, wherein the system management product is a computer-executable application that initiates performance of system management tasks, wherein the system management tasks are tasks that are performed for maintaining a system of configuration items, where the system of configuration items are data processing system components that are modified by the system management tasks.

* * * * *